(12) United States Patent
Wang et al.

(10) Patent No.: US 10,288,735 B1
(45) Date of Patent: May 14, 2019

(54) BINOCULAR TELESCOPE WITH DIGITAL LASER RANGING FUNCTION

(71) Applicant: Kunming Shunho Optics Co., Ltd., Kunming, Yunnan (CN)

(72) Inventors: Liming Wang, Yunnan (CN); Ke Yang, Yunnan (CN)

(73) Assignee: Kunming Shunho Optics Co., Ltd., Kunming (CN)

( * ) Notice: Subject to any disclaimer, the term of this patent is extended or adjusted under 35 U.S.C. 154(b) by 0 days.

(21) Appl. No.: 16/038,215

(22) Filed: Jul. 18, 2018

(30) Foreign Application Priority Data

Mar. 26, 2018 (CN) .......................... 2018 1 0251967

(51) Int. Cl.
| | | |
|---|---|---|
| *G02B 23/00* | (2006.01) | |
| *G01S 17/08* | (2006.01) | |
| *G02B 23/10* | (2006.01) | |
| G02B 27/01 | (2006.01) | |
| G02B 5/04 | (2006.01) | |
| G02B 23/04 | (2006.01) | |

(52) U.S. Cl.
CPC .............. *G01S 17/08* (2013.01); *G02B 23/10* (2013.01); *G02B 5/04* (2013.01); *G02B 23/04* (2013.01); *G02B 2027/0132* (2013.01)

(58) Field of Classification Search
CPC ........ G02B 23/00; G02B 23/02; G02B 23/04; G02B 23/10; G02B 23/105; G02B 23/14

USPC ....... 359/362, 363, 399, 400, 401, 407, 419, 359/428

See application file for complete search history.

(56) References Cited

U.S. PATENT DOCUMENTS

| | | | | |
|---|---|---|---|---|
| 3,519,350 A | * | 7/1970 | Devereux ................ | G01C 3/00 356/21 |
| 9,097,892 B2 | * | 8/2015 | Bach ........................ | G02B 5/04 |
| 9,500,870 B2 | * | 11/2016 | Zuo ....................... | G02B 27/145 |

FOREIGN PATENT DOCUMENTS

CN          201637871 U         11/2010

* cited by examiner

*Primary Examiner* — Arnel C Lavarias (57) ABSTRACT

A binocular telescope with digital laser ranging function, comprising an objective component, a beam splitter and coincidence prism system and an ocular component, and the beam splitter and coincidence prism system is arranged between the objective component and the ocular component; the beam splitter and coincidence prism system comprises a roof prism and a composite prism, the composite prism is composed of an isosceles prism, a right-angle prism A and a right-angle prism B, wherein the right-angle prism A and the right-angle prism B have the same shape and symmetrically abut on the two isosceles planes of the isosceles prism. The binocular telescope of the invention not only has observation function, but also has laser ranging function, and can display the target characters such as optical virtual sight and measured distance in the form of character in the field of view.

10 Claims, 6 Drawing Sheets

Fig. 7

BINOCULAR TELESCOPE WITH DIGITAL LASER RANGING FUNCTION

CROSS REFERENCE TO RELATED APPLICATIONS

The present application claims the benefit of Chinese Patent Application No. 201810251967.5 filed on Mar. 26, 2018, the contents of which are hereby incorporated by reference.

TECHNICAL FIELD

The invention relates to a binocular telescope with digital laser ranging function, belonging to the technical field of optical instruments.

BACKGROUND

At present, the binocular telescope with laser ranging function has the problem that it cannot meet the requirements of actual mass production from the point view of optical mechanical properties. The products with good performance have complex optical mechanical structure and difficult process, while the low-end products cannot meet the actual application requirements due to poor performance The erecting prism used by the binocular telescope with laser ranging function includes Porro prism, Schmidt-Pechan prism and Abbe prism. By comparison, it is found that the Porro prism has slightly smaller qualified field of view and large space volume when the same material is used, so the final product is relatively bulky. The Schmidt-Pechan prism is compact in size but has high light loss, and it is difficult to enlarge the aperture. The structure is too complex after the beam splitter prism required for laser ranging is compounded, and changes in the shape such as back bulging caused by the required space result in an unsightly product. The size of the Abbe prism is between the above two, and its optical property is superior to the above two. Such prism has large qualified field of view and low light loss. However, its complex production process may result in high price.

Therefore, it is necessary to improve the prior art.

Figure 1:
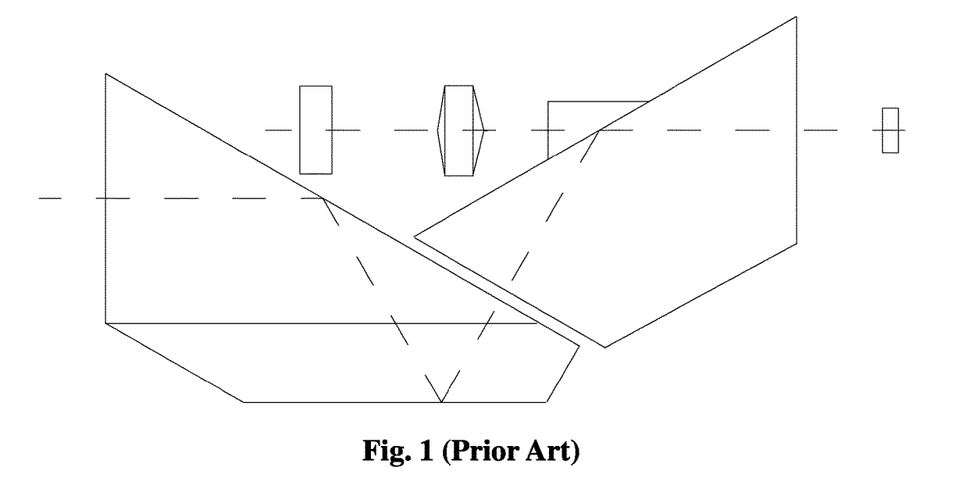
FIG. 1 is a structural diagram of an erecting prism of the prior art.

As shown in FIG. 1, the existing erecting prism group for binocular telescope with laser ranging function, Patent No. ZL201020133893.4, an erecting prism group capable of displaying optical virtual sight and character information, showing a simple coincidence system. Such prism group usually composed of a roof prism and an isosceles prism can reverse the image formed by the front system (such as the objective lens) and transfer it to the rear system (such as the ocular) in the light path.

Although the system can display the additional graphics and text information based on imaging principle of lens and beam splitter principle of prism plane, it still has two obvious insurmountable defects. One is that the space provided by the prism to the display device is narrow, resulting in a small field of view, only one third of the field of view of the other light path. For example, only a line of simple four-digit characters can be displayed, and a large field of view for display of graphics and text information cannot be achieved. The other is that the beam splitting film is far from the normal incidence, resulting in a system transmittance of less than 35%, and the brightness of the displayed image is extremely low and the product cannot be used in the daytime. Therefore, it is difficult to see the characters due to narrow space, simple structure, poor imaging quality, and unclear additional graphics and text information of the imaging lens group.

SUMMARY OF THE INVENTION

The purpose of the invention is to provide a binocular telescope with digital laser ranging function to overcome the defects in the prior art. The telescope of the invention not only has observation function, but also has laser ranging function, and can display the target characters such as optical virtual sight and measured distance in the form of character in the field of view. Seamless joining of the observation function, target information processor and display can be achieved to form an organically combined and perfect product. Due to the proper optical-mechanical structure and the simple process, the product is suitable for mass production.

The purpose of the invention is realized by the following technical schemes:

A binocular telescope with digital laser ranging function, comprising an objective component, a beam splitter and coincidence prism system and an ocular component; the beam splitter and coincidence prism system is arranged between the objective component and the ocular component; the beam splitter and coincidence prism system comprises a roof prism and a composite prism, the composite prism is composed of an isosceles prism, a right-angle prism A and a right-angle prism B, wherein the right-angle prism A and the right-angle prism B have the same shape and symmetrically abut on the two isosceles planes of the isosceles prism; or the composite prism is composed of a right-angle prism A and a right-angle prism; wherein a right-angle plane of the right-angle prism is longer than the slope of the right-angle prism A, and the right-angle plane abuts on the slope of the right-angle prism A.

Further, the objective component comprises a first lens, a second lens and a third lens; the first lens, the second lens and the third lens are arranged in the same axial direction.

Further, the ocular component comprises a fourth lens and a fifth second lens; the fourth lens and the fifth lens are arranged in the same axial direction.

Further, if the composite prism is composed of the isosceles prism, the right-angle prism A and the right-angle prism B, the binocular telescope further comprises a projection display component which is composed of a display, an imaging lens A, a plane mirror and an imaging lens B; the display is arranged above a reflection-transmission plane of the roof prism, the image on the display is reflected to the imaging lens A via the reflection-transmission plane of the roof prism along an incident light axis, and the image is projected to a beam splitter plane B and reflected after passing through the plane mirror and then the imaging lens B; a detector B is arranged in parallel on a reflection and transmission plane of the isosceles prism, the outside of the right-angle prism A is provided with an observation focal plane A, the detector B is imaged by an emergent light axis A, the observation focal plane A is imaged by an emergent light axis B, they are intersected with each other on a beam splitter plane A; wherein the beam splitter plane A and the beam splitter plane B are formed by two isosceles planes of the isosceles prism.

Further, the angle α of the roof prism is 55°-64°;
the angle β of the right-angle prism is 27°-32°;
and the angle δ of the isosceles prism is 110°-128°.

Further, the angle α of the roof prism is preferably 60°;

the angle β of the right-angle prism is preferably 30°; and the angle δ of the isosceles prism is preferably 120°.

Further, the overlaid graphics and text information include: graphics, signs, symbols and characters.

Further, if the composite prism is composed of the right-angle prism A and the right-angle prism, the detector B is arranged in parallel on the reflection and transmission plane of the right-angle prism, and the observation focal plane on the outside of the right-angle prism A1 is provided with a transmission type display device.

Further, one of two light paths from two cylinders of the binocular telescope is provided with an emission device at the position opposite to the detector B (7).

The invention further discloses another binocular telescope with digital laser ranging function, comprising an objective component, a beam splitter and coincidence prism system and an ocular component; the beam splitter and coincidence prism system is arranged between the objective component and the ocular component;

the beam splitter and coincidence prism system comprises the roof prism and the composite prism, the composite prism in one of two cylinders of the binocular telescope is composed of the isosceles prism, the right-angle prism A and the right-angle prism B, wherein the right-angle prism A and the right-angle prism B have the same shape and symmetrically abut on the two isosceles planes of the isosceles prism; the composite prism in the other cylinder is composed of a right-angle prism A and a right-angle prism; wherein a right-angle plane of the right-angle prism is longer than the slope of the right-angle prism A, and the right-angle plane abuts on the slope of the right-angle prism A.

In the invention, the object incident ray enters the objective lens and the roof prism through the object incident light axis, and is reflected by the reflection-transmission plane and then reflected after passing through the roof prism reflection plane, and exits from the transmission plane of the roof prism and enters the composite prism composed of the right-angle prism B, the isosceles prism and the right-angle A prism. The light passes through the beam splitter plane B and reaches another beam splitter plane A after being reflected by the reflection and transmission plane. The light of the visible light spectrum directly passes through the beam splitter plane A, exits from the right-angle prism A, and reaches the observation focal plane A along the emergent light axis B; the light of the laser reflected by the object to be measured for distance measurement is reflected on the beam splitter plane A, and exits from the reflection and transmission plane of the isosceles prism and reaches the detector B. Since the light path is reversible, one of the two light paths of the binocular telescope with laser ranging function can be equipped with an emission device at the position opposite to the detector B, so that the laser can be emitted from the objective lens as a collimated beam. The prism group can transmit the visible image from the objective lens to the ocular for the eyes to observe, and the laser beam can be used for distance measurement at the same time.

For the projection display component, the incident ray from the display is reflected by the reflection-transmission plane of the roof prism through the incident light axis of the display to reach the imaging lens A, and then is reflected by the plane mirror and imaged by the imaging lens B to enter the composite prism by the reflection and transmission plane of the isosceles prism, and is reflected to the reflection and transmission plane by the beam splitter plane B and fully reflected by the reflection and transmission plane to reach the beam splitter plane A and then the observation focal plane A along the emission light axis B. This part of the red spectrum light passes through the beam splitter plane A19 and is imaged on the observation focal plane A together with the light of the visible light spectrum from the objective lens. The imaging lens A and the imaging lens B are designed based on the optical imaging principle, which can enable high-definition imaging of graphics and text information in large field of view.

For the binocular telescope with digital laser ranging function of the invention, if dot-matrix programmable display device is used, any graphics and text information can be displayed at will due to its large field of view of the projection displayed by the beam splitter and coincidence prism system.

The invention is applicable to the observation and distance measurement of finite distance target and infinite distance target as well.

One beneficial effect of the invention is as follows: the binocular telescope can be used for imaging and observing the visible imaging light, and simultaneously processing the other laser beam without interfering with the visible imaging light beam. The spatial structure features of the invention enable the seamless combination between the present invention and the electro-optic display device so as to form a binocular telescope with such functions as observation, laser ranging, and graphics and text information display, etc. When the graphics and text information display does not work, the complete field of view of the white light viewing window is not cut, and no optical property is lost. The system is featured by compact structure, simple light path logic and simple processing technology of parts.

The other beneficial effect of the invention is as follows: the beam splitter plane B of the beam splitter and coincidence prism system can be cancelled, the simplified optical system of a right-angle prism composed of an isosceles prism and a right-angle prism B simplifies the projection display component, and a transmission type display device which is LCD or OLED can be further arranged at the observation focal plane A directly. Therefore, a binocular telescope with laser ranging function (also known as binoculars) is further formed.

In the drawings, there are: 1. right-angle prism A, 2. isosceles prism, 3. right-angle prism B, 4. roof prism, 5. observation focal plane A, 6. display, 7. detector B, 8. imaging lens A, 9. plane mirror, 10. imaging lens B, 11. incident light axis of object composite spectrum, 12. emergent light axis A, 13. emergent light axis B, 14. incident light axis of display, 15. reflection (internal reflection and external reflection)-transmission plane of roof prism, 16. roof prism reflection plane, 17. beam splitter plane B, 18. reflection and transmission plane, 19. beam splitter plane A, 20. first lens, 21. second lens, 22. third lens, 23. fourth lens, 24. fifth lens, 25. right-angle prism, 6A1. transmission type display device, 7A1. emission device, and 7A2. detector.

DETAILED DESCRIPTION OF THE PREFERRED EMBODIMENT

Example 1

Figure 2:
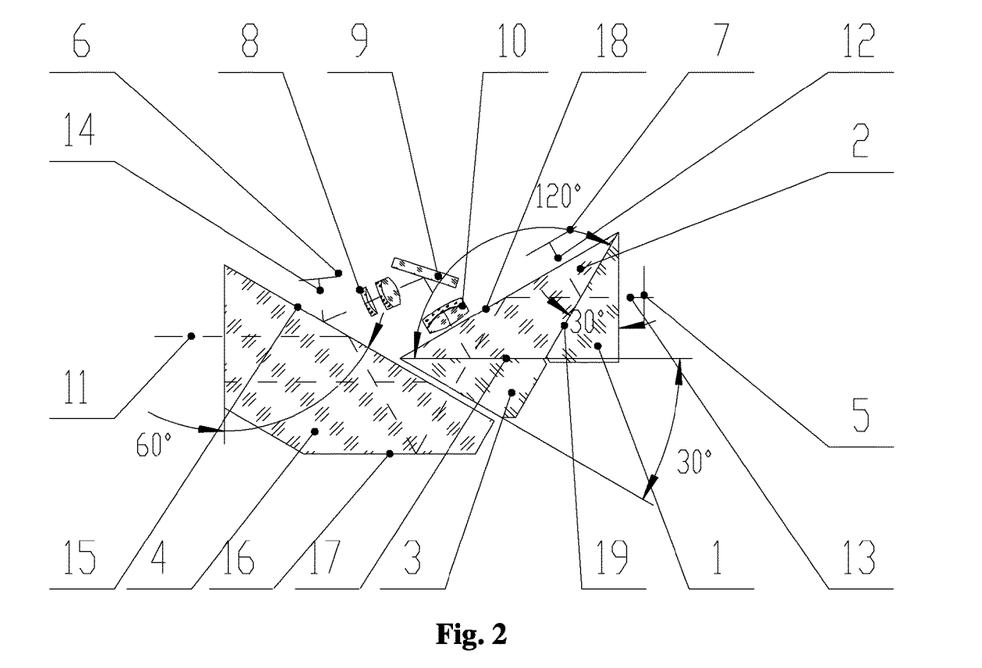
FIG. 2 is a structural diagram of a beam splitter and coincidence prism system in embodiment 1 of the invention.
Figure 4:
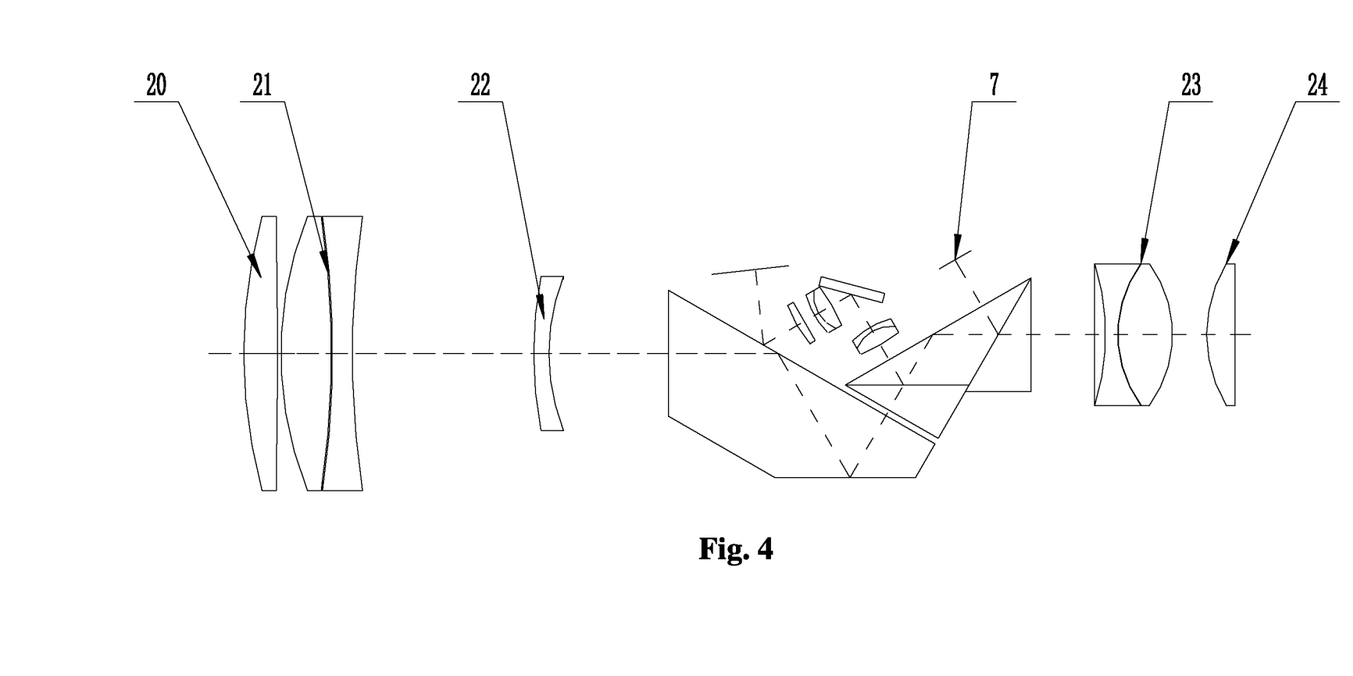
FIG. 4 is an optical system diagram of embodiment 1 of the invention.
Figure 5:
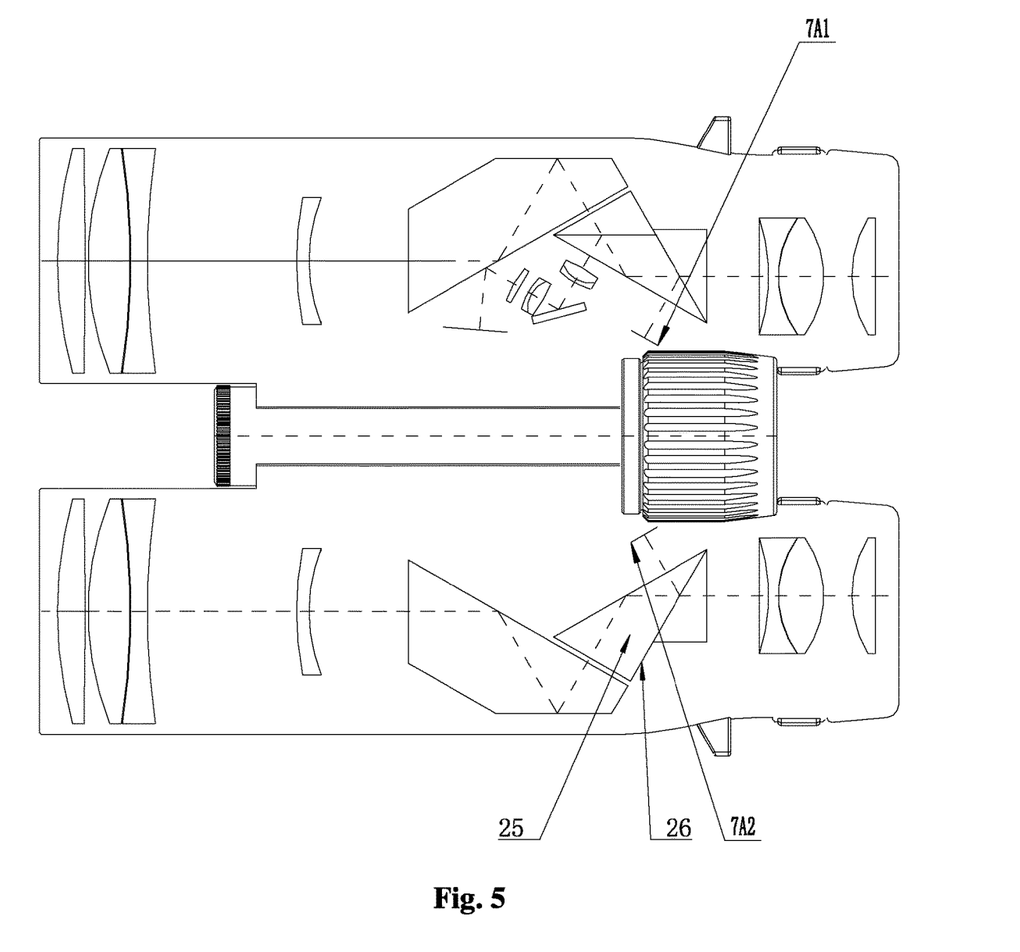
FIG. 5 is a structural diagram of a binocular telescope in embodiment 1 of the invention.

FIG. 1 to FIG. 5 show a binocular telescope with digital laser ranging function, comprising an objective component, a beam splitter and coincidence prism system and an ocular component; the beam splitter and coincidence prism system is arranged between the objective component and the ocular component;

The beam splitter and coincidence prism system comprises a roof prism 4 and a composite prism, the composite prism in one of two cylinders of the binocular telescope is composed of an isosceles prism 2, a right-angle prism A1 and a right-angle prism B3, wherein the right-angle prism A1 and the right-angle prism B3 have the same shape and symmetrically abut on the two isosceles planes of the isosceles prism 2; the composite prism in the other cylinder is composed of a right-angle prism A1 and a right-angle prism 25; wherein a right-angle plane 26 of the right-angle prism 25 is longer than the slope of the right-angle prism A1, and the right-angle plane 26 abuts on the slope of the right-angle prism A1.

The object from a distance is imaged by the objective component which comprises a first lens 20, a second lens 21 and a third lens 22. The first lens 20, the second lens 21 and the third lens 22 are arranged in the same axial direction.

As shown in FIG. 2, the beam splitter and coincidence prism system in one cylinder (i.e., one light path) comprises the roof prism 4 and the composite prism, the composite prism is arranged to be composed of the isosceles prism 2, the right-angle prism A1 and the right-angle prism B3; the right-angle prism A1 and the right-angle prism B3 have the same shape and symmetrically abut on the two isosceles planes of the isosceles prism 2 to form a beam splitter plane A19 and a beam splitter plane B17; an imaging lens B10 in parallel to an reflection and transmission plane 18 is arranged at a distance from the reflection and transmission plane 18 of the isosceles prism 2, and arrange a plane mirror 9 and an imaging lens A8 located on the plane mirror light axis; a display 6 is arranged above a reflection-transmission plane 15 of the roof prism 4, the image of the display 6 is reflected to the imaging lens A8 along the incident light axis 14 through the reflection-transmission plane 15 provided with the roof prism 4, the image is projected and reflected on the beam splitter plane B17 after passing through the plane mirror 9 and then the imaging lens B10; a detector B7 is arranged in parallel above the reflection and transmission plane 18 of the isosceles prism 2, the outside of the right-angle prism A1 is provided with an observation focal plane A5, the detector B7 is imaged by an emergent light axis A12, the observation focal plane A5 is imaged by an emergent light axis B13, and both of them are intersected on the beam splitter plane A19.

The angle α of the roof prism of the invention is 55°-64°; the angle β of the right-angle prism is 27°-32°; and the angle δ of the isosceles prism is 110°-128°.

The angle α of the roof prism of the invention is preferably 60°; the angle β of the right-angle prism is preferably 30°; and the angle δ of the isosceles prism is preferably 120°.

Figure 3:
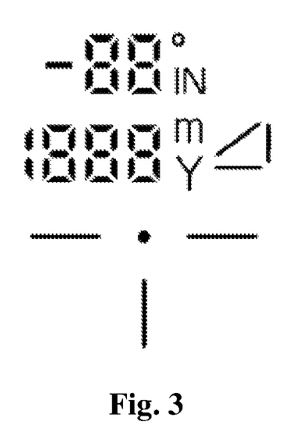
FIG. 3 is a sample diagram of overlaid graphics and text information in embodiment 1 of the invention.

The overlaid graphics and text information of the invention includes graphics, signs, symbols and characters as shown in FIG. 3. FIG. 3 is a special application case of the displayed content. The upper line can display degree of angle, or temperature, or height with unit of degree or inch. The lower line of four digits shows that the unit can be m or Y (yard).

In the invention, the visible light imaged by the objective lens enters the roof prism 4 along the light axis 11, and is reflected by the reflection (internal reflection and external reflection)-transmission plane 15 and reflected by the roof prism reflection plane 16, and then exits from the reflection (internal reflection and external reflection)-transmission plane 15 of the roof prism 4, and enters the composite prism composed of the right-angle prism B3, the isosceles prism 2 and the right-angle prism A1. The light passes through the beam splitter plane B17 and reaches another beam splitter plane A19 after being reflected by the reflection and transmission plane 18. The light of the visible light spectrum directly passes through the beam splitter plane A19, exits from the right-angle prism A1, and reaches the observation focal plane A5 along the emergent light axis B13; the light of the laser reflected by the object to be measured for distance measurement is reflected on the beam splitter plane A19, and exits from the reflection and transmission plane 18 of the isosceles prism 2 and reaches the detector B7. Since the optical path is reversible, one of the two optical paths of the binocular telescope with laser ranging function can be equipped with an emission device 7A1 at the position opposite to the detector B7, so that the laser can be emitted from the objective lens as a collimated beam. The prism group can transmit the visible image from the objective lens to the ocular for the eyes to observe, and the laser beam can be used for distance measurement at the same time.

The incident ray from the display 6 is reflected by the reflection-transmission plane 15 of the roof prism 4 through the incident light axis of the display 6 to reach the imaging lens A8, and then is reflected by the plane mirror 9 and imaged by the imaging lens B10 to enter the composite prism by the reflection and transmission plane 18 of the isosceles prism 2, and is reflected to the reflection and transmission plane 18 by the beam splitter plane B17 and fully reflected by the reflection and transmission plane 18 to reach the beam splitter plane A19. This part of the red spectrum light passes through the beam splitter plane A19 and is imaged on the observation focal plane A5 together with the light of the visible light spectrum from the objective lens. The imaging lens A8 and the imaging lens B10 are designed based on the optical imaging principle, which can enable high-definition imaging of text information in large field of view.

The ocular component comprises a fourth lens 23 and a fifth second lens 24; the fourth lens 23 and the fifth lens 24 are arranged in the same axial direction. The fourth lens 23 and the fifth lens 24 are designed based on the optical imaging principle and may have different structures. The visible light image formed by the objective component and the red light image of the display 6 can be simultaneously observed by the ocular component.

The composite prism in the other cylinder is composed of the right-angle prism A1 and the right-angle prism 25 by reference to the description of embodiment 2.

Example 2

Figure 6:
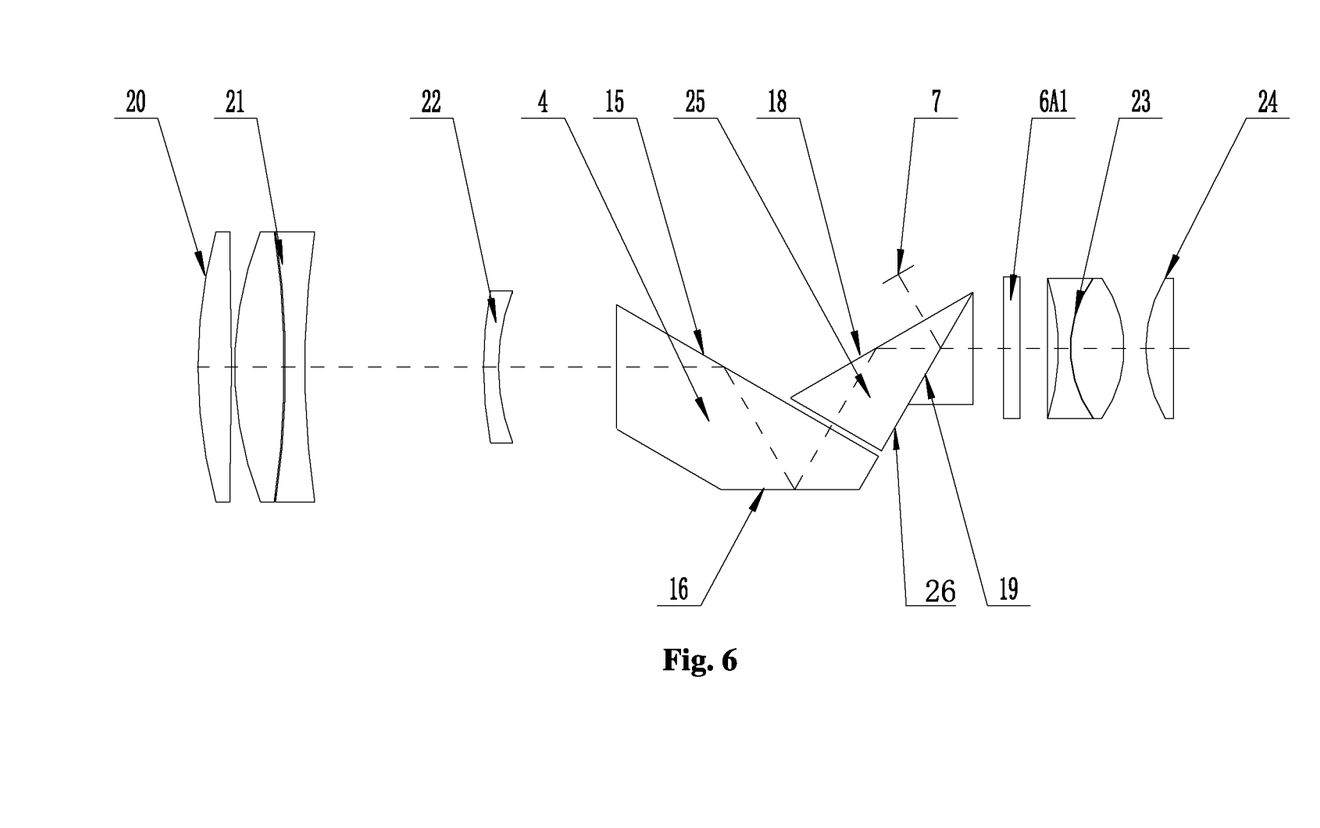
FIG. 6 is an optical system diagram of a binocular telescope with simplified projection display component in embodiment 2 of the invention.
Figure 7:
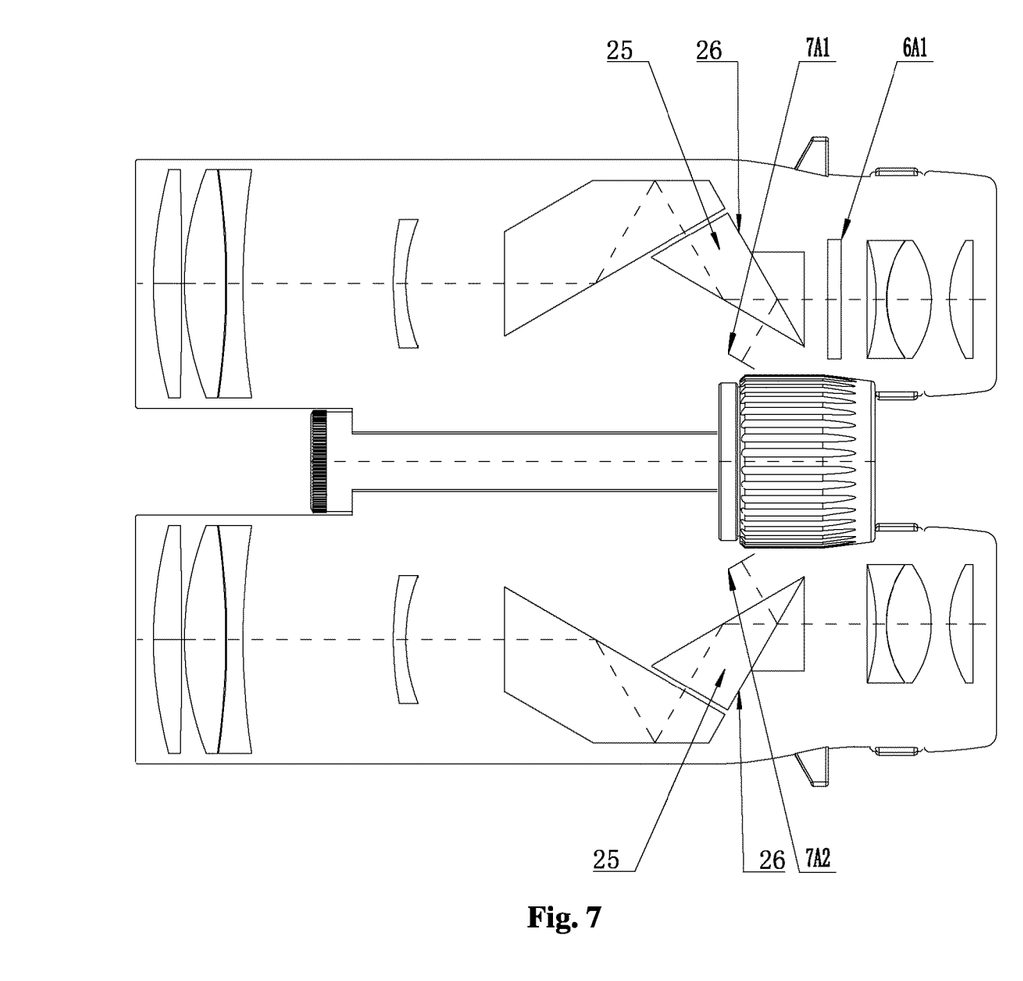
FIG. 7 is a structural diagram of a binocular telescope with simplified projection display component in embodiment 2 of the invention.

FIG. 6 to FIG. 7 show a binocular telescope with digital laser ranging function, comprising an objective component, a beam splitter and coincidence prism system and an ocular component; the beam splitter and coincidence prism system is arranged between the objective component and the ocular component;

the beam splitter and coincidence prism system comprises a roof prism 4 and a composite prism which is composed of the right-angle prism A1 and the right-angle prism 25; wherein the right-angle plane 26 of the right-angle prism 25 is longer than the slope of the right-angle prism A1, and the right-angle plane 26 abuts on the slope of the right-angle prism A1.

FIG. 7 is the structural diagram of the binocular telescope with simplified projection display component of the invention, and FIG. 6 is the optical system diagram of the binocular telescope for one of the light paths.

The object from a distance is imaged by the objective component which comprises a first lens 20, a second lens 21 and a third lens 22. The first lens 20, the second lens 21 and the third lens 22 are arranged in the same axial direction.

The beam splitter and coincidence prism system as shown in FIG. 6 comprises the roof prism 4 and the composite prism which is composed of the right-angle prism A1 and the right-angle prism 25 to form the beam splitter plane A19 only, and the beam splitter plane B17 can be cancelled; a detector B7 is arranged in parallel on a reflection and transmission plane 18 of the right-angle prism 25, the observation focal plane on the outside of the right-angle prism A1 is provided with a transmission type display device 6A1, and the display device can be LCD or OLED.

The graphics and text information displayed on the display device include graphics, signs, symbols and characters as shown in FIG. 3.

In the invention, the visible light imaged by the objective lens enters the roof prism 4 along the light axis, and is reflected by the reflection plane 15 and then by the roof prism reflection plane 16, and exits from the reflection (internal reflection and external reflection)-transmission plane 15 of the roof prism 4, and then enters the composite prism composed of the right-angle prism 25 and the right-angle prism A1. The light reaches the beam splitter plane A19, and the light of the visible light spectrum passes through the beam splitter plane A19 directly, exits from the right-angle prism A1 and reaches the observation focal plane provided with the transmission type display device 6A1 along the emergent light axis; the light of the laser reflected by the object to be measured for distance measurement is reflected on the beam splitter plane A19, and exits from the reflection and transmission plane 18 of the right-angle prism 25 and reaches the detector B7. Since the optical path is reversible, one of the two optical paths of the binocular telescope with laser ranging function can be equipped with an emission device 7A1 at the position opposite to the detector B7, so that the laser can be emitted from the objective lens as a collimated beam. The prism group can transmit the visible image from the objective lens to the ocular for the eyes to observe, and the laser beam can be used for distance measurement at the same time.

The display 6A1 is directly arranged on the focal plane to enable high-definition imaging of graphics and text information in large field of view.

The ocular component comprises a fourth lens 23 and a fifth second lens 24; the fourth lens 23 and the fifth lens 24 are arranged in the same axial direction. The fourth lens 23 and the fifth lens 24 are designed based on the optical imaging principle and may have different structures. The visible light image formed by the objective component and the red light image of the display 6 can be simultaneously observed by the ocular component.

The invention claimed is:

1. A binocular telescope with digital laser ranging function, comprising an objective component, a beam splitter and coincidence prism system and an ocular component, and the beam splitter and coincidence prism system being arranged between the objective component and the ocular component;

wherein the beam splitter and coincidence prism system comprises a roof prism (4) and a composite prism, the composite prism is composed of an isosceles prism (2), a right-angle prism A (1) and a right-angle prism B (3), wherein the right-angle prism A (1) and the right-angle prism B (3) have a same shape and symmetrically abut on two isosceles planes of the isosceles prism.

2. The binocular telescope with digital laser ranging function according to claim 1, wherein the objective component comprises a first lens (20), a second lens (21) and a third lens (22); the first lens (20), the second lens (21) and the third lens (22) are arranged in a same axial direction.

3. The binocular telescope with digital laser ranging function according to claim 1, wherein the ocular component comprises a fourth lens (23) and a fifth second lens (24); the fourth lens (23) and the fifth lens (24) are arranged in a same axial direction.

4. The binocular telescope with digital laser ranging function according to claim 1, wherein if the composite prism is composed of the isosceles prism (2), the right-angle prism A (1) and the right-angle prism B (3);

the binocular telescope further comprises a projection display component which is composed of a display (6), an imaging lens A (8), a plane mirror (9) and an imaging lens B (10); the display (6) is arranged above a reflection-transmission plane (15) of the roof prism (4), an image on the display (6) is reflected to the imaging lens A (8) via the reflection-transmission plane (15) of the roof prism (4) along an incident light axis (14), and the image is projected to a beam splitter plane B (17) and reflected after passing through the plane mirror (9) and then the imaging lens B (10); a detector B (7) is arranged in parallel on a reflection and transmission plane (18) of the isosceles prism (2), an outside of the right-angle prism A (1) is provided with an observation focal plane A(5), the detector B (7) is imaged by an emergent light axis A (12), the observation focal plane A(5) is imaged by an emergent light axis B (13), the emergent light axis A (12) and the emergent light axis B (13) are intersected with each other on a beam splitter plane A (19); wherein the beam splitter plane A (19) and the beam splitter plane B (17) are formed by two isosceles planes of the isosceles prism (2).

5. The binocular telescope with digital laser ranging function according to claim 4, wherein:

an angle α of the roof prism is 55°-64°;
an angle β of the right-angle prism is 27°-32°;
and an angle δ of the isosceles prism is 110°-128°.

6. The binocular telescope with digital laser ranging function according to claim 5, wherein:

the angle α of the roof prism is 60°;
the angle β of the right-angle prism is 30°;
and the angle δ of the isosceles prism is 120°.

7. The binocular telescope with digital laser ranging function according to claim 4, wherein the beam splitter and coincidence prism system can overlaid graphics and text information, and the graphics and text information include graphics, signs, symbols and characters.

8. The binocular telescope with digital laser ranging function according to claim 5, wherein the beam splitter and coincidence prism system can overlaid graphics and text information, and the graphics and text information include graphics, signs, symbols and characters.

9. The binocular telescope with digital laser ranging function according to claim 6, wherein the beam splitter and coincidence prism system can overlaid graphics and text information, and the graphics and text information include graphics, signs, symbols and characters.

10. A binocular telescope with digital laser ranging function, comprising a objective component, a beam splitter and coincidence prism system and a ocular component, and the beam splitter and coincidence prism system being arranged between the objective component and the ocular component;

wherein the beam splitter and coincidence prism system comprises a roof prism (4) and a composite prism, the composite prism in one of two cylinders of the binocular telescope is composed of a isosceles prism (2), a right-angle prism A (1) and a right-angle prism B (3), wherein the right-angle prism A (1) and the right-angle prism B (3) have a same shape and symmetrically abut on two isosceles planes of the isosceles prism (2);

the composite prism in the other cylinder is composed of a right-angle prism A (1) and a right-angle prism (25); wherein a right-angle plane (26) of the right-angle prism (25) is longer than the slope of the right-angle prism A (1), and the right-angle plane (26) abuts on a slope of the right-angle prism A (1).

\* \* \* \* \*